(12) United States Patent
Miida

(10) Patent No.: US 12,403,893 B2
(45) Date of Patent: Sep. 2, 2025

(54) CONTROL APPARATUS FOR VEHICLE

(71) Applicant: TOYOTA JIDOSHA KABUSHIKI KAISHA, Toyota (JP)

(72) Inventor: Yusuke Miida, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 178 days.

(21) Appl. No.: 18/497,965

(22) Filed: Oct. 30, 2023

(65) Prior Publication Data

US 2024/0140398 A1 May 2, 2024

(30) Foreign Application Priority Data

Oct. 31, 2022 (JP) ................................ 2022-175018

(51) Int. Cl.
 *B60W 20/50* (2016.01)
 *B60K 6/387* (2007.10)
 *B60K 6/442* (2007.10)
 *B60W 10/02* (2006.01)
 *B60W 20/40* (2016.01)
 *B60W 50/02* (2012.01)
 *B60W 50/038* (2012.01)

(52) U.S. Cl.
 CPC ............. *B60W 20/50* (2013.01); *B60K 6/387* (2013.01); *B60K 6/442* (2013.01); *B60W 10/02* (2013.01); *B60W 20/40* (2013.01); *B60W 50/0205* (2013.01); *B60W 50/0225* (2013.01); *B60W 50/038* (2013.01); *B60W 2510/0208* (2013.01); *B60W 2520/00* (2013.01); *B60W 2710/021* (2013.01); *B60Y 2200/92* (2013.01)

(58) Field of Classification Search
 None
 See application file for complete search history.

(56) References Cited

U.S. PATENT DOCUMENTS

| | | | |
|---|---|---|---|
| 10,000,205 B2* | 6/2018 | Koshiba | .............. B60W 30/192 |
| 2015/0047915 A1* | 2/2015 | Kasamai | ................ B60K 6/445 |
| | | | 903/946 |
| 2018/0093660 A1 | 4/2018 | Koshiba et al. | |

FOREIGN PATENT DOCUMENTS

WO 2016151657 A1 9/2016

* cited by examiner

*Primary Examiner* — Lail A Kleinman
(74) *Attorney, Agent, or Firm* — Hunton Andrews Kurth LLP

(57) ABSTRACT

A control apparatus for a vehicle that includes (i) a first engagement device configured to connect and disconnect an engine and an electric motor to and from each other, and (ii) a second engagement device configured to connect and disconnect the electric motor and drive wheel to and from each other. In event of a failure of the second engagement device, the control apparatus is configured to forcibly bring the second engagement device into an engaged state and to bring the first engagement device into an engaged state, so as to cause the vehicle to perform a limp-home running in a first running mode in which the vehicle runs using at least the engine. When a running speed of the vehicle becomes lower than a predetermined low-speed threshold value during the limp-home running, the control apparatus is configured to bring the first engagement device into a released state.

3 Claims, 2 Drawing Sheets

CONTROL APPARATUS FOR VEHICLE

This application claims priority from Japanese Patent Application No. 2022-175018 filed on Oct. 31, 2022, the disclosure of which is herein incorporated by reference in its entirety.

FIELD OF THE INVENTION

The present invention relates to a control apparatus for a vehicle and, more particularly, to a control executed in event of a failure of a second engagement device disposed between an electric motor and a drive wheel.

BACKGROUND OF THE INVENTION

There is known a hybrid vehicle including a drive wheel, an engine, an electric motor connected to a power transmission path between the engine and the drive wheel in a power transmittable manner, a first engagement device configured to connect and disconnect the engine and the electric motor to and from each other, and a second engagement device configured to connect and disconnect the electric motor and the drive wheel to and from each other, wherein the engine and the electric motor are used as power sources for driving the vehicle. In such a vehicle, it is possible to switch between a first running mode in which the vehicle runs using at least the engine with both of the first and second engagement devices being in respective engaged states and a second running mode in which the vehicle runs using the electric motor with the first engagement device being in a released state and with the second engagement device being in the engaged state. An example of such a vehicle is disclosed in Patent Document 1. In this Patent Document 1, in event of an ON failure in which the second engagement device (CL2) is maintained in the engaged state, the vehicle is caused to perform a limp-home running in the first running mode (HEV mode) with switching from the first running mode to the second running mode (EV mode) being inhibited, thereby increasing a cruising distance of the limp-home running.

PRIOR ART DOCUMENT

Patent Document

[Patent Document 1]
WO2016/151657

SUMMARY OF THE INVENTION

However, in event of the ON failure in which the second engagement device is maintained in the engaged state, if the first engagement device cannot be caused to slip, there is a risk that the engine could stall when a running speed of the vehicle is reduced. In addition, in event of an OFF failure in which the second engagement device is maintained in the released state, power transmission from the power sources (the engine and the electric motor) to the drive wheel is cut off, thereby causing a risk that the vehicle could not run.

The present invention has been made in view of the above circumstances, and an object of the present invention is to enable the vehicle to run in the first running mode while avoiding an engine stall at a low running speed of the vehicle in either case of the ON failure or the OFF failure of the second engagement device.

According to a first aspect of the present invention, there is provided a control apparatus for a vehicle that includes a drive wheel, an engine, an electric motor connected to a power transmission path between the engine and the drive wheel in a power transmittable manner, a first engagement device configured to connect and disconnect the engine and the electric motor to and from each other, and a second engagement device configured to connect and disconnect the electric motor and the drive wheel to and from each other, wherein the engine and the electric motor are used as power sources for driving the vehicle. The control apparatus is configured to switch between a first running mode in which the vehicle runs using at least the engine with both of the first and second engagement devices being in respective engaged states and a second running mode in which the vehicle runs using the electric motor with the first engagement device being in a released state and with the second engagement device being in the engaged state. In event of a failure of the second engagement device, the control apparatus is configured to forcibly bring the second engagement device into the engaged state and to bring the first engagement device into the engaged state, so as to cause the vehicle to perform a limp-home running in the first running mode. When a running speed of the vehicle becomes lower than a predetermined low-speed threshold value during the limp-home running, the control apparatus is configured to bring the first engagement device into the released state.

According to a preferred arrangement of the first aspect of the invention, the second engagement device includes a hydraulically-operated clutch that is to be operated based on a hydraulic pressure supplied to the hydraulically-operated clutch through a first valve that is to be controlled in accordance with a control command signal. The control apparatus is configured to determine whether the second engagement device has failed or not, by comparing a command content of the control command signal and an actual operation state of the hydraulically-operated clutch of the second engagement device. The vehicle includes, in addition to the first valve, a second valve that is to be selectively placed in pressure discharging and charging states, such that the second valve allows the hydraulic pressure to be discharged therethrough from the hydraulically-operated clutch when being placed in the pressure discharging state, and such that the second valve allows the hydraulic pressure to be charged therethrough to the hydraulically-operated clutch when being placed in the pressure charging state. The control apparatus is configured, when determining that the second engagement device has failed, to forcibly bring the hydraulically-operated clutch of the second engagement device into the engaged state, by placing the second valve in the charging state.

According to a second aspect of the present invention, in the control apparatus according to the first aspect of the present invention, when the running speed of the vehicle is lower than the low-speed threshold value in event of the failure of the second engagement device, the control apparatus is configured to cause the vehicle to perform the limp-home running in the second running mode, by forcibly bringing the second engagement device into the engaged state and bringing the first engagement device into the released state.

In the control apparatus constructed as described above, in event of the failure of the second engagement device, the second engagement device is forcibly brought into the engaged state and the first engagement device is brought into the engaged state to perform the limp-home running in the first running mode in which the engine is used as the power source. Therefore, the cruising distance of the limp-home running can be extended. Further, since the second engagement device is forcibly brought into the engagement state, the limp-home running can be performed in the first running mode not only in event of an ON failure in which the second engagement device is maintained in the engagement state but also in event of an OFF failure in which the second engagement device is maintained in the released state. On the other hand, when the vehicle running speed falls below the predetermined low-speed threshold value during the limp-home running, the first engagement device is brought into the released state. Therefore, the engine is disconnected from the power transmission path, whereby the engine stall is avoided. In this case, for example, it is possible to continue the limp-home running in the second running mode as in the second aspect of the invention, and to extend the cruising distance by resuming the limp-home running in the first running mode when the vehicle running speed becomes equal to or higher than the low-speed threshold value.

DETAILED DESCRIPTION OF PREFERRED EMBODIMENT

The present invention can be applied to various hybrid vehicles each including an engine and an electric motor as power sources and switchable between at least a first running mode in which the vehicle runs using the engine and a second running mode in which the vehicle runs using the electric motor. As the electric motor, a motor generator that also functions as a generator is preferably used, but an electric motor that does not function as a generator can also be used. A hydraulic power transmission apparatus such as a torque converter or an automatic transmission may be provided in a power transmission path between the electric motor and the drive wheels as necessary. When a lock-up clutch (direct coupling clutch) is provided in the hydraulic power transmission apparatus, the lock-up clutch may be used as the second engagement device. A shifting engagement device of an automatic transmission may be used as the second engagement device.

In event of the failure of the second engagement device, the second engagement device is forcibly brought into the engaged state. However, for example, in event of the ON failure in which the second engagement device is maintained in the engaged state, the forcible-engagement control is not necessarily required, and the forcible-engagement control may be performed only in even of the OFF failure in which the second engagement device is maintained in the released state. When the vehicle running speed falls below the predetermined low-speed threshold value, the first engagement device is brought into the released state to avoid the engine stall, and the limp-home running can be continued, for example, in the second running mode. Where a slip engagement control of the first engagement device can be performed, the vehicle can run at a low speed, stop or start in the first running mode by the slip engagement control of the first engagement device.

An embodiment of the present invention will be described in detail below with reference to the drawings.

Figure 1:
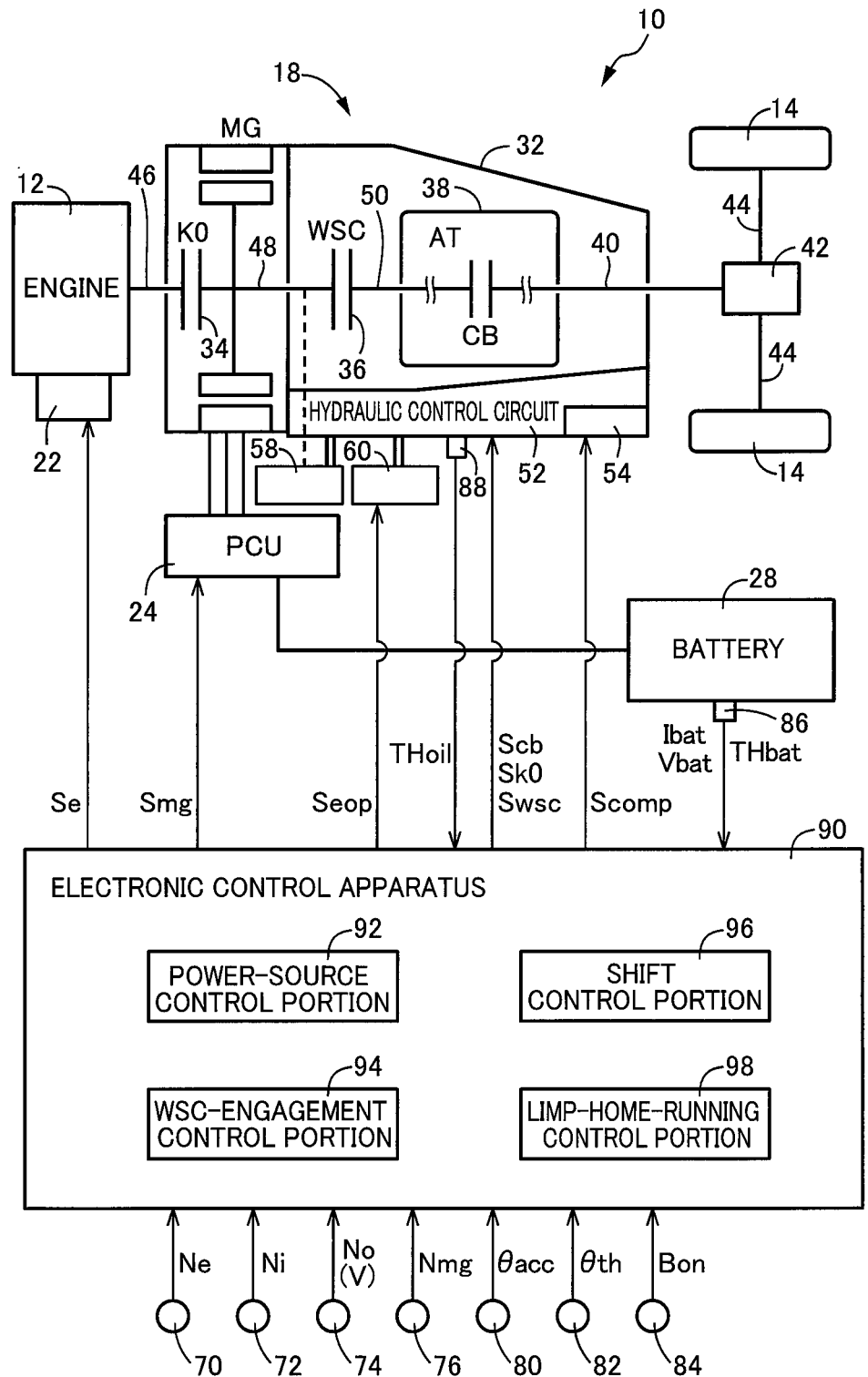
FIG. 1 is a schematic configuration diagram illustrating a vehicle drive system including an electronic control apparatus according to an embodiment of the present invention.

FIG. 1 is a diagram illustrating a schematic configuration of a drive system of a vehicle 10 including an electronic control apparatus 90 as a control apparatus according to the embodiment of the present invention, and is a diagram illustrating control functions and a main part of a control system for various controls in the vehicle 10. The vehicle 10 is a hybrid electric vehicle that includes an engine 12 and an electric motor MG as power sources. The vehicle 10 includes the engine 12, drive wheels 14 that are left and right rear wheels or front wheels, and a power transmission apparatus 18 provided in a power transmission path between the engine 12 and the drive wheels 14. The engine 12 is an internal combustion engine such as a gasoline engine or a diesel engine. In the engine 12, an engine control device 22 including a throttle actuator, a fuel injection device and an ignition device is controlled by the electronic control apparatus 90, so that an engine torque Te which is a torque of the engine 12 is controlled. The electric motor MG is a rotary electric machine having a function as a motor that generates a mechanical power from an electric power and a function as a generator that generates the electric power from the mechanical power, and is a so-called motor generator. The electric motor MG is connected to a battery 28 via a power control unit (PCU) 24 including an inverter. The PCU 24 is controlled by the electronic control apparatus 90, whereby an MG torque Tmg, which is a torque of the motor MG, is controlled.

The power transmission apparatus 18 includes a K0 clutch 34, a WSC clutch 36 and an automatic transmission (AT) 38 that are provided in a casing 32 that is a non-rotating member attached to a body of the vehicle 10, such that the power is transmitted from a transmission output shaft 40 to the drive wheels 14 via a differential gear device 42 and a pair of drive shafts 44. The K0 clutch 34 is a first engagement device that is configured to connect and disconnect the engine 12 and the motor MG to and from each other, and serves as an engine connection/disconnection clutch that is configured to disconnect the engine 12 from the power transmission path. The WSC clutch 36 as a hydraulically-operated clutch included in a second engagement device that is configured to connect and disconnect the electric motor MG and the drive wheels 14 to and from each other, and serves as a starting clutch or an input clutch by being slip-engagement controlled by the electronic control apparatus 90.

In the casing 32, the power transmission apparatus 18 includes an engine connection shaft 46 that connects the engine 12 and the K0 clutch 34 and a motor connection shaft 48 that connects the K0 clutch 34 and the WSC clutch 36. The motor MG is connected to the motor connection shaft 48 so as to be able to transmit the power. Each of the K0 clutch 34 and the WSC clutch 36 is a wet-type or dry-type frictional engagement device constituted by a multi-disc clutch or a single-disc clutch that is to be pressed by an actuator, and is to be switched between operation states such as an engaged state and a released state by the electronic control apparatus 90. The operation state of the K0 clutch 34 is switched when a K0 torque Tk0, which is a torque capacity of the K0 clutch 34, is changed by a K0 hydraulic pressure PRk0 supplied from a hydraulic control circuit 52. The operation state of the WSC clutch 36 is switched by when a WSC torque Twsc, which is a torque capacity of the WSC clutch 36, is changed by a WSC hydraulic pressure PRwsc supplied from the hydraulic control circuit 52. An input side member of the WSC clutch 36 is connected to the motor connection shaft 48, and an output side member of the WSC clutch 36 is connected to a transmission input shaft 50, which is an input rotary member of the automatic transmission 38.

The automatic transmission 38 is, for example, a known planetary gear type automatic transmission including a plurality of planetary gear devices and a plurality of engagement devices CB. Each of the engagement devices CB is a hydraulic friction engagement device including, for example, a multi-plate or single-plate clutch or brake that is to be pressed by a hydraulic actuator, a band brake that is to be tightened by a hydraulic actuator, or the like. A CB torque Tcb, which is a torque capacity of each of the plurality of engagement devices CB, is changed by the regulated CB hydraulic pressure PRcb supplied from the hydraulic control circuit 52, whereby an operation state of each of the engagement devices CB is switched between an engaged state and a released state. The automatic transmission 38 is a stepped transmission that establishes one of a plurality of gear positions providing respective different gear ratios γat (=input rotational speed Ni/output rotational speed No) by engaging at least one of the engagement devices CB. The input rotational speed Ni is a rotational speed of the transmission input shaft 50 and is an input rotational speed of the automatic transmission 38. The input rotational speed Ni is also a rotational speed of the output-side member of the WSC clutch 36. The output rotational speed No is a rotational speed of the transmission output shaft 40, and is an output rotational speed of the automatic transmission 38.

The vehicle 10 includes a mechanical hydraulic pump 58 and an electric hydraulic pump 60. The mechanical hydraulic pump 58 is connected to, for example, the motor connection shaft 48 via a gear, a belt, a chain or the like in a power transmittable manner, and is to be driven by at least one of the engine 12 and the electric motor MG to discharge a working fluid used in the power transmission apparatus 18. The electric hydraulic pump 60 is to be rotationally driven by a pump motor (not shown) to discharge the working fluid. The working fluid discharged from the mechanical hydraulic pump 58 and the electric hydraulic pump 60 is supplied to the hydraulic control circuit 52. The hydraulic control circuit 52 outputs the CB hydraulic pressure PRcb, the K0 hydraulic pressure PRk0, the WSC hydraulic pressure PRwsc and the like, which are regulated based on the working fluid discharged from the mechanical hydraulic pumps 58 and the electric hydraulic pumps 60.

Figure 2:
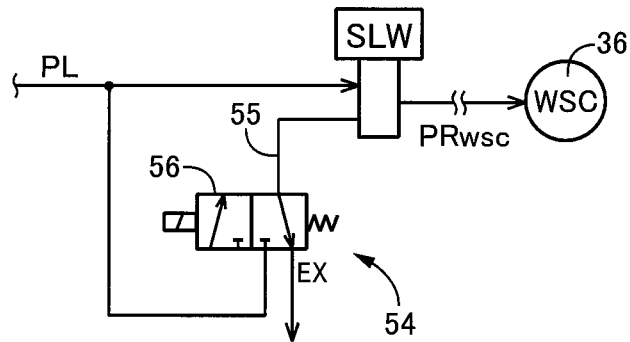
FIG. 2 is a hydraulic circuit diagram illustrating an example of a hydraulic control circuit relating to a WSC clutch included in a vehicle shown in FIG. 1.

The hydraulic control circuit 52 includes a WSC forcible-engagement portion 54 in relation to an engagement/disengagement control of the WSC clutch 36. FIG. 2 shows a hydraulic circuit related to the WSC clutch 36 in the hydraulic control circuit 52, in which the WSC hydraulic pressure PRwsc regulated by a linear solenoid valve SLW as a first valve using a line pressure PL as a source pressure is supplied to the WSC clutch 36 for the engagement/disengagement control. The line pressure PL is a hydraulic pressure serving as the source pressure for various control hydraulic pressures, and is controlled in accordance with, for example, an accelerator opening degree θacc. The linear solenoid valve SLW is, for example, of a normally open type that is configured, when an excitation current is not supplied to the linear solenoid valve SLW, to output the line pressure PL as it is as the WSC hydraulic pressure PRwsc, so that the WSC clutch 36 is engaged when the excitation current is not supplied to the linear solenoid valve SLW. When the excitation current is supplied to the linear solenoid valve SLW in accordance with a WSC-hydraulic-pressure control command signal Swsc, the WSC hydraulic pressure PRwsc is reduced with increase of a magnitude of the excitation current, so that the WSC torque Twsc is reduced with the increase of the magnitude of the excitation current. When the magnitude of the excitation current becomes equal to or larger than a predetermined value, the WSC clutch 36 is released. A drain passage 55 of the linear solenoid valve SLW is provided with an electromagnetic switch valve 56 as a second valve serving as the WSC forcible-engagement portion 54.

The electromagnetic switch valve 56 is normally held in a normal connection state as shown in FIG. 2, so as to allow the working fluid is drained from the drain passage 55. However, when the exciting current is supplied to the electromagnetic switch valve 56 in accordance with a WSC forcible-engagement command signal Scomp outputted from the electronic control apparatus 90, the electromagnetic switch valve 56 is switched to a forcible-engagement connection state (pressure charging state) from the above-described normal connection state (pressure discharging state), so that the line pressure PL is supplied to the drain passage 55 to forcibly engage the WSC clutch 36. That is, even if the linear solenoid valve SLW is maintained in the closed state (drain state) and output of the WSC hydraulic pressure PRwsc from the linear solenoid valve SLW is stopped, due to, for example, a short circuit in an electric circuit of the linear solenoid valve SLW, the line pressure PL is supplied from the electromagnetic switch valve 56 to the WSC clutch 36 via the drain passage 55 and the linear solenoid valve SLW by switching the electromagnetic switch valve 56 to a forcible-engagement connection state, whereby the WSC clutch 36 is forcibly engaged. The linear solenoid valve SLW may be also a normally-closed type in which the output of the WSC hydraulic pressure PRwsc is stopped when the excitation current is not supplied to the linear solenoid valve SLW. Although not shown, the K0 clutch 34 is also subjected to the engagement/disengagement control by controlling the K0 hydraulic pressure PRk0 outputted from a linear solenoid valve in accordance with a K0-hydraulic-pressure control command signal Sk0, for example, similarly to the WSC clutch 36.

The vehicle 10 includes the electronic control apparatus 90 as a control apparatus configured to execute various controls. The electronic control apparatus 90 includes a so-called microcomputer including, for example, a CPU, a RAM, a ROM and an input/output interface, and is configured to execute the various controls in the vehicle 10. The electronic control apparatus 90 includes a plurality of computers for an engine control, an MG control, a hydraulic pressure control and the like as necessary.

The electronic control apparatus 90 is configured to receive various information necessary for the various controls, for example, from an engine speed sensor 70, an input speed sensor 72, an output speed sensor 74, an MG speed sensor 76, an accelerator-opening degree sensor 80, a throttle-opening degree sensor 82, a brake switch 84, a battery sensor 86 and a fluid temperature sensor 88, for example, wherein the various information include an engine rotational speed Ne that is a rotational speed of the engine 12, an input rotational speed Ni, an output rotational speed No corresponding to a running speed V of the vehicle 10, an MG rotational speed Nmg that is a rotational speed of the electric motor MG, an accelerator opening degree θacc which is an amount of operation of an accelerator pedal or the like and which represents an amount of output requested by a vehicle driver of the vehicle 10, a throttle-valve opening degree θth that is an opening degree of an electronic throttle valve, a brake ON signal Bon that is a signal representing a state in which a brake pedal is being operated by the vehicle driver for operating wheel brakes, a battery temperature THbat that is a temperature of the battery 28 as an electric storage device, a battery charge/discharge current Ibat and a battery voltage Vbat of the battery 28, and an oil temperature THoil of the working fluid in the hydraulic control circuit 52. The MG rotational speed Nmg is the same as a rotational speed of the input-side member of the WSC clutch 36, and the input rotational speed Ni is the same as a rotational speed of the output-side member of the WSC clutch 36. Based on the rotational speeds Nmg and Ni, it is possible to determine the operation state of the WSC clutch 36, that is, whether the WSC clutch 36 is in a fully engaged state, a slip-engaged state or a released state.

The electronic control apparatus 90 outputs an engine control command signal Se for controlling the engine 12, an MG control command signal Smg for controlling the electric motor MG, a CB hydraulic-pressure control command signal Scb for controlling the engagement devices CB, a K0 hydraulic-pressure control command signal Sk0 for controlling the K0 clutch 34, a WSC hydraulic-pressure control command signal Swsc for controlling the WSC clutch 36, a WSC forcible-engagement command signal Scomp for forcibly engaging the WSC clutch 36, and an electric-hydraulic-pump control command signal Seop to various devices provided in the vehicle 10 such as the engine control device 22, the PCU 24, the hydraulic control circuit 52 and the electric hydraulic pump 60. The hydraulic control circuit 52 is provided with the linear solenoid valve SLW that is to be controlled by the WSC hydraulic-control command signal Swsc, the electromagnetic switch valve 56 that is to be switched to the forcible-engagement connection state by the WSC forcible-engagement command signal Scomp, and various solenoid valves for switching fluid passages and controlling hydraulic pressure in accordance with the K0 hydraulic-control command signal Sk0 and the CB hydraulic-control command signal Scb.

The electronic control apparatus 90 functionally includes a power-source control portion 92, a WSC-engagement control portion 94, a shift control portion 96, and a limp-home running control portion 98 in order to realize the various controls in the vehicle 10.

The power-source control portion 92 calculates a requested drive amount of the vehicle 10 requested by the vehicle driver, for example, by applying the accelerator opening degree θacc and the vehicle running speed V to a requested drive amount map that represents a pre-stored relationship obtained by experimentation or determined by an appropriate design theory, namely, a predetermined relationship for obtaining the requested drive amount. The requested drive amount is, for example, a requested drive torque Trdem [Nm], a requested drive force Frdem [N], or a requested drive power Prdem [W] of the drive wheels 14. The power-source control portion 92 calculates a requested input torque Tidem in the transmission input shaft 50 capable of realizing the requested drive amount, by taking account of a transmission loss, an auxiliary load, the gear ratio γat of the automatic transmission 38, for example, and obtains a target engine torque Tetgt and a target MG torque Tmtgt that make it possible to obtain the requested input torque Tidem. Then, the power-source control portion 92 outputs the engine control command signal Se for controlling the engine 12 so as to output the target engine torque Tetgt, and also the MG control command signal Smg for controlling the electric motor MG so as to output the target MG torque Tmtgt.

For example, when the requested input torque Tidem can be covered only by an output of the electric motor MG, the power-source control portion 92 establishes a BEV (Battery Electric Vehicle) running mode that is a motor running mode in which the vehicle 10 runs by driving the electric motor MG only by the electric power from the battery 28. In the BEV running mode, the engine 12 is stopped, with the K0 clutch 34 being released and with the WSC clutch 36 being engaged to perform a BEV running using only the motor MG as the power source. In the BEV running mode, the MG torque Tmg is controlled so as to realize the requested input torque Tidem. On the other hand, when the requested input torque Tidem cannot be covered without using at least an output of the engine 12, the power-source control portion 92 establishes an HEV (Hybrid Electric Vehicle) mode that is an engine running mode. In the HEV running mode, both the K0 clutch 34 and the WSC clutch 36 are engaged to perform an engine running using at least the engine 12 as the power source, i.e., an HEV running. In the HEV running mode, the engine torque Te is controlled so as to realize all or a part of the requested input torque Tidem, and the MG torque Tmg is controlled so as to compensate for a torque portion insufficient by the engine torque Te with respect to the requested input torque Tidem. In the HEV drive mode, for example, the engine 12 may be operated on the optimum fuel-consumption line, and excess or deficiency of the engine torque Te with respect to the requested input torque Tidem may be increased or decreased by the MG torque Tmg, which is the torque of the electric motor MG. The BEV running mode corresponds to a second running mode, and the HEV running mode corresponds to a first running mode.

When the vehicle 10 is in a stopped state, the WSC-engagement control portion 94 executes a control for maintaining the WSC clutch 36 in the released state or slip-engaged state. By bringing the WSC clutch 36 into the slip-engaged state in the stopped state of the vehicle 10, it is possible to cause the vehicle 10 to perform a so-called creep running that causes a creep phenomenon in which the vehicle 10 is moved slowly, for example, when a brake OFF operation is performed while the accelerator is OFF. While the vehicle 10 is running in the BEV running mode or the HEV running mode, the WSC clutch 36 is controlled so as to be maintained in the fully engaged state. However, when the input rotational speed Ni is lower than an operable rotational speed of the engine 12 during running of the vehicle 10 in the HEV running mode at a low running speed, the WSC clutch 36 is controlled to be in the slip-engaged state.

The shift control portion 96 determines whether the automatic transmission 38 is to be shifted or not, for example, by using a shift map that is a predetermined relationship, and outputs the CB hydraulic-pressure control command signal Scb for switching the gear position of the automatic transmission 38 as necessary. The shift map is a predetermined relationship having a shift line for determining whether the automatic transmission 38 is to be shifted or not, on a two dimensional coordinate system having the vehicle running speed V and the requested driving torque Trdem as variables, for example.

Figure 3:
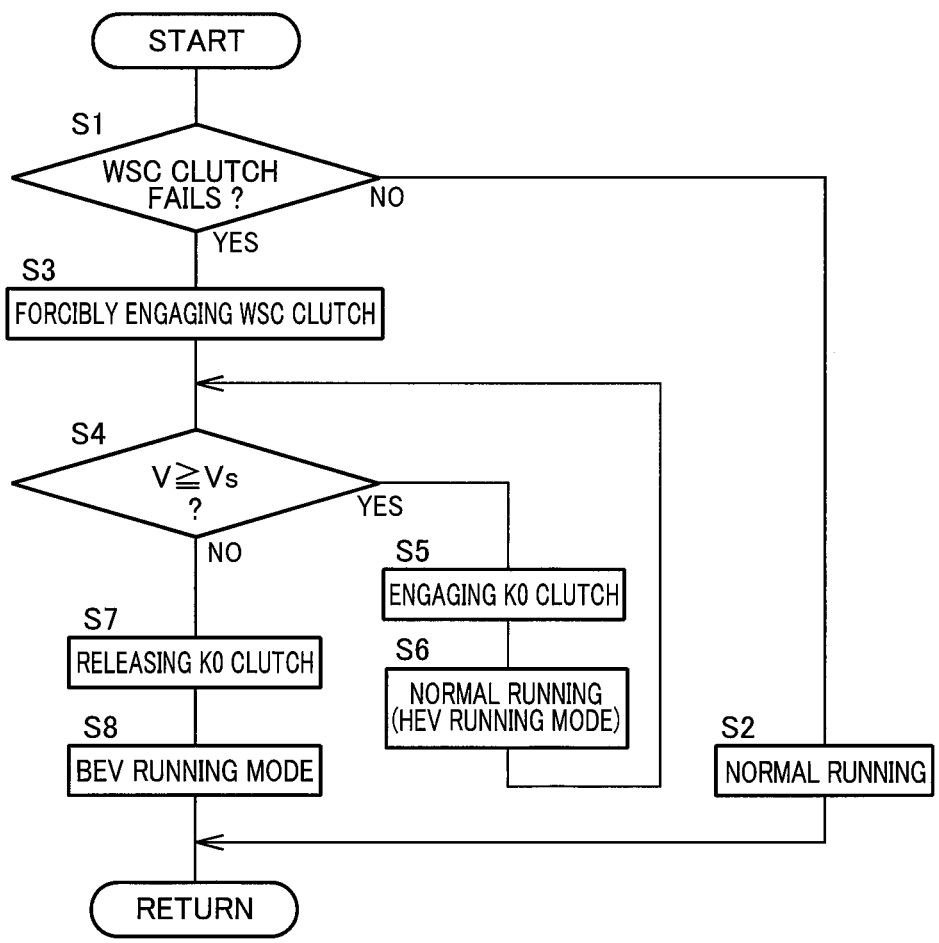
FIG. 3 is a flowchart for specifically explaining a control routine executed by a limp-home-running control portion functionally provided in the electronic control apparatus shown in FIG. 1.

When the WSC clutch 36 fails, the limp-home-running control portion 98 performs a limp-home running so as to extend a cruising distance of the vehicle 10. To be more specific, the limp-home-running control portion 98 performs the limp-home running in accordance with a control routine including steps S1 to S8, which is shown in a flowchart of FIG. 3. In the flowchart of FIG. 3, "YES" and "NO" in each of determination steps S1 and S4 (represented by rhombus shapes) mean affirmative determination and negative determination, respectively.

The control routine is initiated with step S1 at which the limp-home-running control portion 98 determines whether or not the WSC clutch 36 has failed. When the WSC clutch 36 has not failed, the control flow goes to step S2 at which the limp-home-running control portion 98 executes a normal running of the vehicle 10. The failure of the WSC clutch 36 is an ON failure in which the WSC clutch 36 is maintained in the engaged state, or an OFF failure in which the WSC clutch 36 is maintained in the released state, for example, due to disconnection or short circuit in the electric circuit of the linear solenoid valve SLW. Therefore, the limp-home-running control portion 98 can determine whether or not the WSC clutch 36 has failed, for example, by comparing the WSC-hydraulic-pressure control command signal Swsc with the operation state of the WSC clutch 36 such as a differential rotation $\Delta Nmi$ (=Nmg−Ni) between the MG rotational speed Nmg and the input rotational speed Ni. During the normal running at step S2, the vehicle 10 runs with the HEV running mode and the BEV running mode being switched, by the power-source control portion 92, depending on the vehicle running speed V and the requested drive torque Trdem, for example.

When it is determined at step S1 that the WSC clutch 36 has failed, the control flow goes to step S3 at which the limp-home-running control portion 98 forcibly brings the WSC clutch 36 into the engaged state. Specifically, by outputting the WSC forcible-engagement command signal Scomp, the electromagnetic switch valve 56 of the WSC forcible-engagement portion 54 is switched to the forcible-engagement connection state (pressure charging state) from the normal connection state (pressure discharging state). Thus, in event of the OFF-failure in which the normally-open linear solenoid valve SLW is closed due to a short circuit or the like in the electric circuit, the WSC hydraulic pressure PRwsc is drained from the drain passage 55 whereby the WSC clutch 36 is maintained in the released state, the line pressure PL is supplied from the electromagnetic switch valve 56 to the WSC clutch 36 via the drain passage 55 and the linear solenoid valve SLW so that the WSC clutch 36 is forcibly engaged by the line pressure PL. In event of the ON-failure in which the linear solenoid valve SLW is opened due to disconnection or the like, the line pressure PL is directly supplied from the linear solenoid valve SLW to the WSC clutch 36 whereby the WSC clutch 36 is maintained in the engaged state by the line pressure PL, the WSC clutch 36 is maintained in the engaged state regardless of whether or not the line pressure PL is supplied from the electromagnetic switch valve 56. That is, the WSC clutch 36 is brought into the engaged state regardless of the ON failure or the OFF failure.

Step S3 is followed by step S4 at which the limp-home-running control portion 98 determines whether or not the vehicle running speed V is equal to or higher than a predetermined low-speed threshold value Vs. When the vehicle running speed V is equal to or higher than the predetermined low-speed threshold value Vs, the control flow goes to step S5 at which the limp-home-running control portion 98 maintains the K0 clutch 34 in the engaged state. Step S5 is followed by step S6 at which the limp-home-running control portion 98 performs the normal running. The low-speed threshold value Vs is a running speed value at which the K0 clutch 34 is released in the control of the normal running, for example, a low running speed at which the engine 12 is likely to stall. The normal running at step S6 is the limp-home running performed when the WSC clutch 36 fails. Since the K0 clutch 34 is maintained in the engaged state at step S5, the vehicle 10 runs substantially in the HEV running mode that uses the engine 12 as the power source. In the HEV running mode, for example, it is also possible to charge the battery 28 by performing a regenerative control of the electric motor MG as necessary while causing the vehicle 10 to run using the engine 12 as the power source such that the battery 28 is maintained in a fully charged state.

When the vehicle running speed V is reduced and becomes lower than the low-speed threshold value Vs, namely, when a negative determination is made at step S4, the limp-home-running control portion 98 releases the K0 clutch 34 at step S7 and performs the limp-home running of the vehicle 10 in the BEV running mode using the motor MG as the power source at step S8. By releasing the K0 clutch 34 at step S7, K0, the engine 12 is prevented from stalling. Further, since the engine 12 is stopped in the BEV running mode at step S8, fuel consumption is suppressed. When the vehicle running speed V becomes equal to or higher than the low-speed threshold value Vs, for example, upon re-acceleration or start of the vehicle 10 from the stopped state, an affirmative determination is made at step S4, the vehicle 10 is returned to the limp-home running in the HEV running mode using the engine 12 as the power source at steps S5 and S6.

As described above, according to the limp-home-running control portion 98 functionally provided in the electronic control apparatus 90 of the present embodiment, in event of failure of the WSC clutch 36, the WSC clutch 36 is forcibly engaged and the K0 clutch 34 is engaged to perform the limp-home running in the HEV running mode using the engine 12 as the power source at steps S3, S4, S5 and S6, so that the cruising distance of the limp-home running can be extended. In addition, since the WSC clutch 36 is forcibly brought into the engaged state, it is possible to perform the limp-home running in the HEV running mode not only in event of the ON failure in which the WSC clutch 36 is maintained in the engaged state but also in event of the OFF failure in which the WSC clutch 36 is maintained in the released state.

On the other hand, when the vehicle running speed V becomes lower than the predetermined low-speed threshold value Vs during the limp-home running (the negative determination at step S4), the K0 clutch 34 is brought into the released state at step S7, so that the engine 12 is disconnected from the power transmission path whereby the engine stall is avoided. In this case, the limp-home running can be continued in the BEV running mode at step S8, and when the vehicle running speed V becomes equal to or higher than the low-speed threshold value Vs, the limp-home running in the HEV running mode is resumed at step S6 so as to extend the cruising distance.

Although the embodiment of the present invention has been described in detail with reference to the drawings, the embodiment is merely an embodiment, and the present invention can be carried out with various modifications and improvements based on the knowledge of those skilled in the art.

NOMENCLATURE OF ELEMENTS

10: vehicle
12: engine
14: drive wheel

18: power transmission apparatus (power transmission path)
34: K0 clutch (first engagement device)
36: WSC clutch (second engagement device, hydraulically-operated clutch)
56: electromagnetic switch valve (second valve)
90: electronic control apparatus (control apparatus)
98: limp-home-running control portion
MG: motor
SLW: linear solenoid valve (first valve)
Swsc: WSC-hydraulic-pressure control command signal (control command signal)
V: vehicle running speed
Vs: low-speed threshold value

What is claimed is:

1. A control apparatus for a vehicle that includes a drive wheel, an engine, an electric motor connected to a power transmission path between the engine and the drive wheel in a power transmittable manner, a first engagement device configured to connect and disconnect the engine and the electric motor to and from each other, and a second engagement device configured to connect and disconnect the electric motor and the drive wheel to and from each other, wherein the engine and the electric motor are used as power sources for driving the vehicle, wherein the control apparatus is configured to switch between a first running mode in which the vehicle runs using at least the engine with both of the first and second engagement devices being in respective engaged states and a second running mode in which the vehicle runs using the electric motor with the first engagement device being in a released state and with the second engagement device being in the engaged state, wherein, in event of a failure of the second engagement device, the control apparatus is configured to forcibly bring the second engagement device into the engaged state and to bring the first engagement device into the engaged state, so as to cause the vehicle to perform a limp-home running in the first running mode, and wherein, when a running speed of the vehicle becomes lower than a predetermined low-speed threshold value during the limp-home running, the control apparatus is configured to bring the first engagement device into the released state.

2. The control apparatus according to claim 1, wherein, when the running speed of the vehicle is lower than the low-speed threshold value in event of the failure of the second engagement device, the control apparatus is configured to cause the vehicle to perform the limp-home running in the second running mode, by forcibly bringing the second engagement device into the engaged state and bringing the first engagement device into the released state.

3. The control apparatus according to claim 1, wherein the second engagement device includes a hydraulically-operated clutch that is to be operated based on a hydraulic pressure supplied to the hydraulically-operated clutch through a first valve that is to be controlled in accordance with a control command signal, wherein the control apparatus is configured to determine whether the second engagement device has failed or not, by comparing a command content of the control command signal and an actual operation state of the hydraulically-operated clutch of the second engagement device, wherein the vehicle includes, in addition to the first valve, a second valve that is to be selectively placed in pressure discharging and charging states, such that the second valve allows the hydraulic pressure to be discharged therethrough from the hydraulically-operated clutch when being placed in the pressure discharging state, and such that the second valve allows the hydraulic pressure to be charged therethrough to the hydraulically-operated clutch when being placed in the pressure charging state, and wherein the control apparatus is configured, when determining that the second engagement device has failed, to forcibly bring the hydraulically-operated clutch of the second engagement device into the engaged state, by placing the second valve in the pressure charging state.

* * * * *